United States Patent [19]

Bellettato

[11] Patent Number: 5,388,978
[45] Date of Patent: Feb. 14, 1995

[54] FIXTURE FOR LOADING PLASTIC SHEET MATERIAL INTO A MOLD

[75] Inventor: Bruno Bellettato, Cirie', Italy

[73] Assignee: Iveco Fiat S.p.A., Italy

[21] Appl. No.: 122,333

[22] Filed: Sep. 17, 1993

[30] Foreign Application Priority Data

Sep. 18, 1992 [IT] Italy .................. T092 A 000776

[51] Int. Cl.⁶ .................................................. B29C 31/08
[52] U.S. Cl. ...................................... 425/397; 264/339; 414/19
[58] Field of Search ............ 425/397, 383, 394, 126.1; 414/749, 19; 264/339; 271/264

[56] References Cited

U.S. PATENT DOCUMENTS

| | | | |
|---|---|---|---|
| 3,899,277 | 8/1975 | Winter | 425/397 |
| 4,150,936 | 4/1979 | Shioi et al. | 425/397 |
| 4,432,716 | 2/1984 | Kiss | 425/383 |
| 4,571,320 | 2/1986 | Walker | 425/397 |
| 4,576,560 | 3/1986 | Herman | 425/394 |
| 5,128,090 | 7/1992 | Fuji et al. | 425/388 |

FOREIGN PATENT DOCUMENTS 0271263 6/1988 European Pat. Off. .
1135430 12/1968 United Kingdom .

*Primary Examiner*—Jay H. Woo
*Assistant Examiner*—Robert B. Davis
*Attorney, Agent, or Firm*—Myers, Liniak & Berenato

[57] ABSTRACT

For molding complex mechanical components from plastic material in sheets, any portions of the material projecting from the mold are folded about the respective edges of the mold. The sheets are transferred to the mold on a number of retractable bars moving in relation to at least one reference bar; and a finger is moved towards the mold by an articulated parallelogram mechanism, and is mounted on a supporting bar located between two adjacent retractable bars and adjustable for so orienting the finger as to fold the projecting portion of sheet material in either one of two opposite directions.

10 Claims, 4 Drawing Sheets

FIXTURE FOR LOADING PLASTIC SHEET MATERIAL INTO A MOLD

BACKGROUND OF THE INVENTION

The present invention relates to a fixture for loading plastic sheet material into a mold, whereby at least one sheet is transferred to the mold on supporting means.

A common practice in modern plants manufacturing vehicle body components is to hot mold the parts from plastic sheet material, such as heat-setting fiberglass-reinforced polyester resin known as SMC, which is normally supplied in rolls from which sheets are cut and loaded into the mold.

When molding parts of complex design, each load usually consists of a pack of partially overlapping, rectangular sheets, portions of which sometimes project over the edge of the mold. At present, the projecting portions of the sheets are cut off prior to molding, a technique that not only involves a good deal of time, but also increases the manufacturing cost of the parts being produced.

SUMMARY OF THE INVENTION

It is an object of the present invention to provide a fixture for loading plastic sheet material, and which provides for low-cost as well as better quality production.

According to the present invention, there is provided a fixture for loading plastic sheet material into a mold, whereby at least one sheet is transferred to said mold on supporting means, and at least one portion of said sheet extends outwards of the edge of said mold; characterized by the fact that it comprises at least one element activated when transferring said sheet to said mold, for engaging said portion and folding it about said edge.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
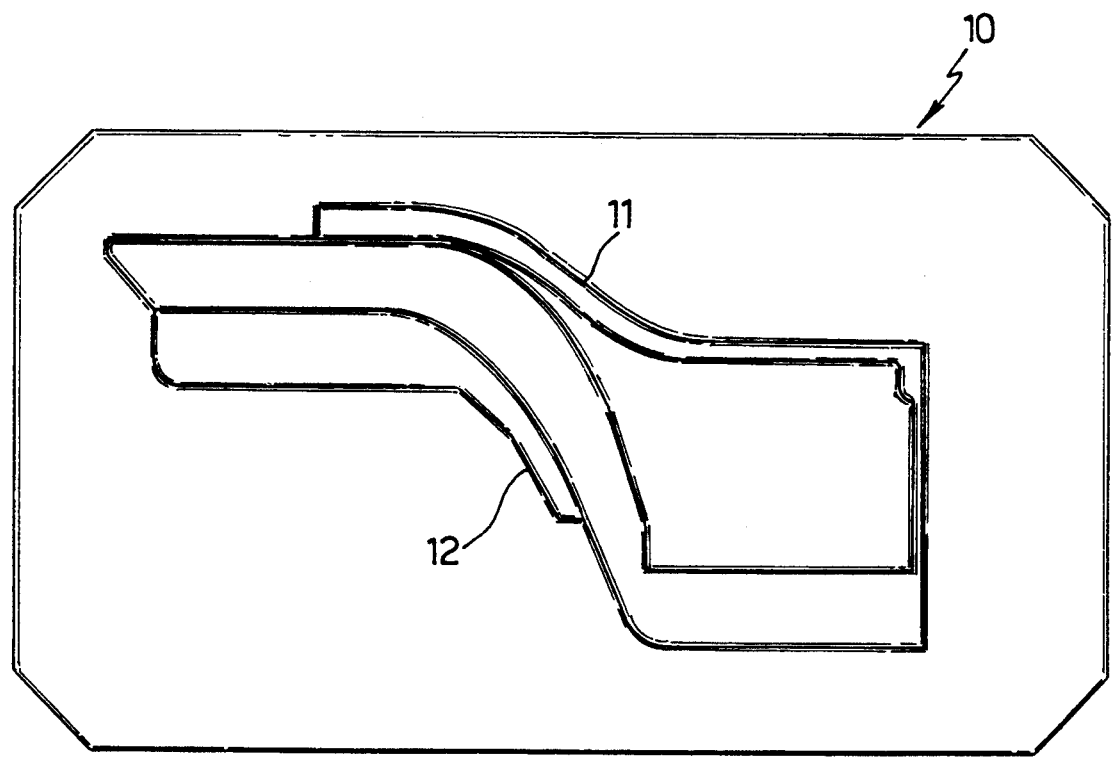
FIG. 1 shows a plan view of a mold loadable using the fixture according to the present invention.

Number 10 in FIG. 1 indicates a mold for forming the footboard of an industrial vehicle cab, which roughly presents a portion for connection to the vehicle body, and an inner foot rest. Mold 10 is therefore of complex design, featuring portions in different planes, and a number of edges, including top and bottom edges 11 and 12, defining the footboard.

The footboard is hot molded from heat-setting fiberglass-reinforced polyester resin known as SMC, which is supplied in rolls of a given width. In view of the complex design of the footboard, one sheet cut off the roll is not sufficient for covering mold 10, which, in this case, requires a pack of three sheets 13, 14 and 15 (FIG. 2) of the same width as the roll and cut to a given length.

Sheets 13–15 are arranged so as to present overlapping portions 16 and 17 for ensuring the continuity of the finished footboard, and present portions 18 extending beyond edge 12 of the footboard, and which may be trimmed without difficulty in known manner after forming. Mold 10 presents a number of small portions 19 initially left exposed by sheets 13–15, but which are safely filled as the material of sheets 13–15 shifts or expands during forming.

Finally, sheets 13–15 present a number of portions, in this case, portions 21 and 22, extending respectively beyond top and bottom edges 11 and 12 of mold 10, and which may be molded into the footboard, for eliminating trimming and, at the same time, reinforcing a highly stressed portion of the finished footboard.

The fixture whereby sheets 13–15 are loaded into mold 10 is indicated as a whole by 25 in FIGS. 3 to 7, and comprises a fixed frame consisting of two side members 23 connected by two end cross members 24 and 26 and an intermediate cross member 27, all three of which are also fitted to a known operating arm 28.

Beneath side members 23, there is mounted a sliding bar 29 fitted at the bottom with an upside down C-shaped channel 31 (FIG. 4), the two arms of which are fitted with a number of spaced horizontal bars 32 parallel to side members 23 and guided by a number of bushes 33 (FIGS. 4 and 6) on cross member 24.

Bar 29 is moved along side members 23, from the FIG. 3 to the FIG. 5 position, by two pneumatic actuators 35, and moves integral with channel 31 so as to slide bars 32, hereinafter referred to as retractable, inside bushes 33.

Figure 3:
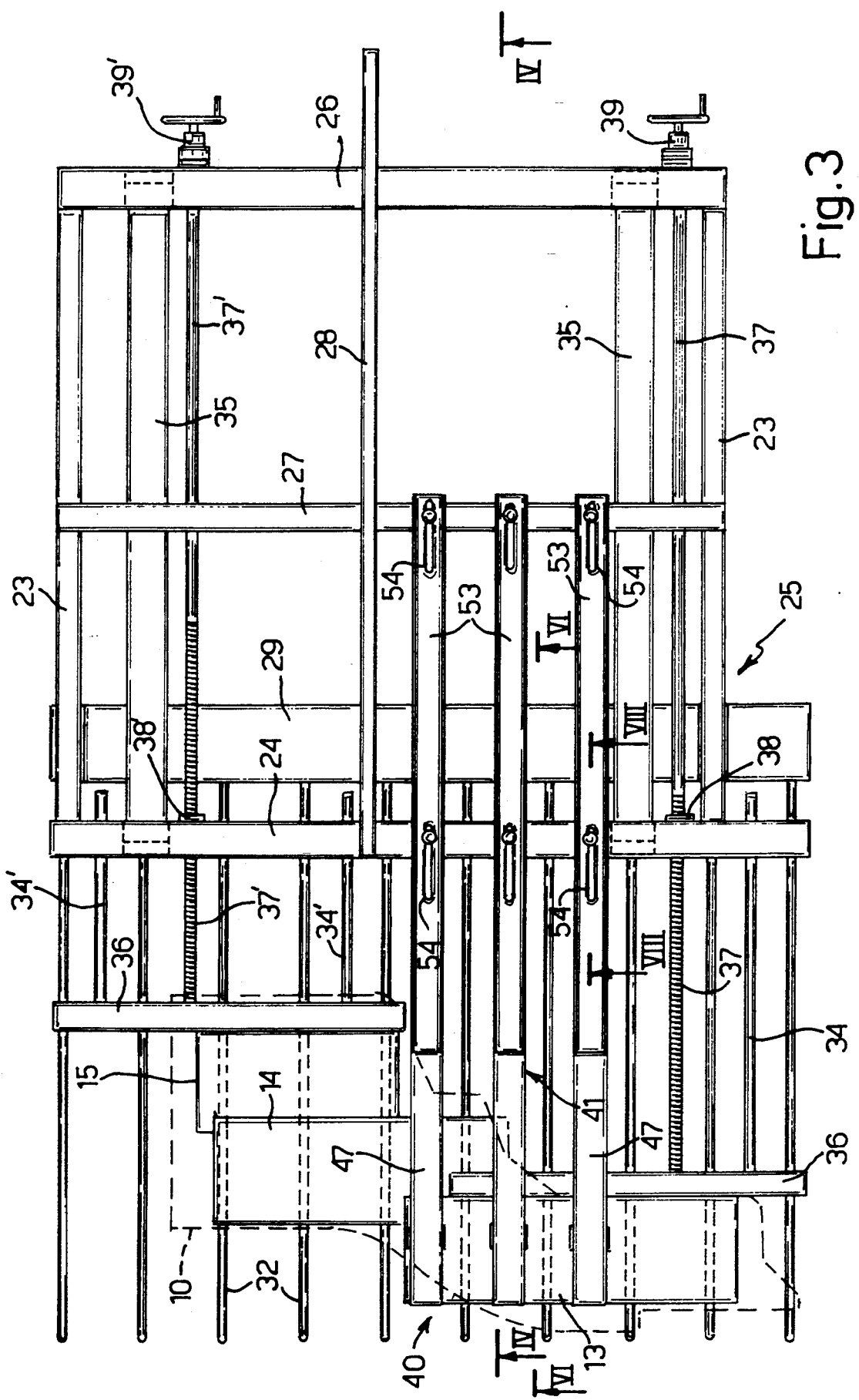
FIG. 3 shows a plan view of the loading fixture.

Cross member 24 is fitted with two sliding bars 34 (only one of which is shown in FIG. 3) fitted to a reference cross member 36 having a number of holes in which slides a corresponding group of bars 32 (substantially the bottom half in FIG. 3). Cross member 36 is also fitted with a rotary bar 37 having a threaded portion engaging a nut screw 38 on cross member 24, and fitted with a handwheel 39 for positioning reference cross member 36 at the required distance in relation to cross member 24.

Another group of retractable bars 32 (the top half in FIG. 3) slides inside a number of holes on a second cross member 36' mounted in adjustable manner using the same members described above in connection with bar 36, and which are therefore shown using the same numbering system plus a (').

Loading fixture 25 also comprises at least one element activatable for engaging the sheet portion to be folded over into mold 10. More specifically, fixture 25 may present one or more devices 40 (FIGS. 4 and 5) for folding portion 21 against edge 11 of mold 10, and/or one or more devices 41 (FIGS. 6 and 7) for folding portion 22 against edge 12 of mold 10. As both devices 40 and 41 are substantially symmetrical, the following detailed description applies to both.

Each device 40, 41 substantially comprises an element or finger 42 supported on an articulated parallelogram mechanism for moving finger 42 substantially vertically, and consisting of a pair of levers 43, 44 pivoting on a square 46. Square 46 is fitted to a horizontal bar 47 in turn fitted with a pneumatic actuator 48 having a rod 49 connected in articulating manner to arm 51 of lever 44. At the bottom, finger 42 presents a curved surface 52 for folding portion 21, 22 downwards against respective edges 11, 12 of mold 10.

Figure 4:
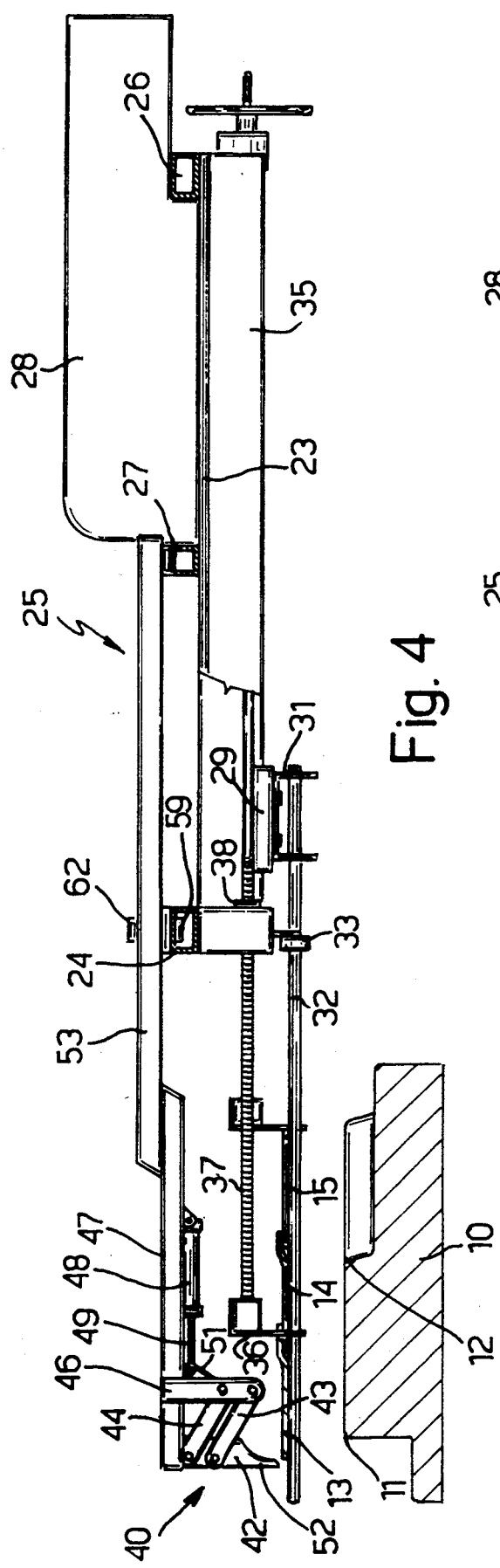
FIG. 4 shows a section along line IV—IV of FIG. 3 in a first operating position.
Figure 5:
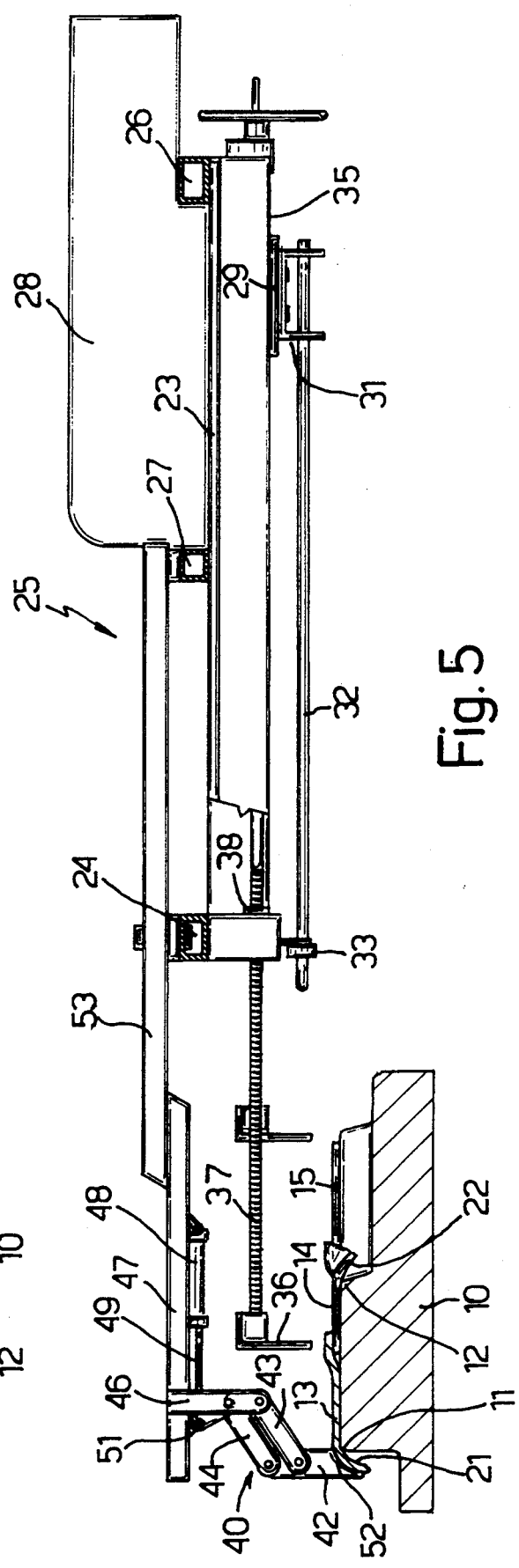
FIG. 5 shows the FIG. 4 section in a further operating position.
Figure 6:
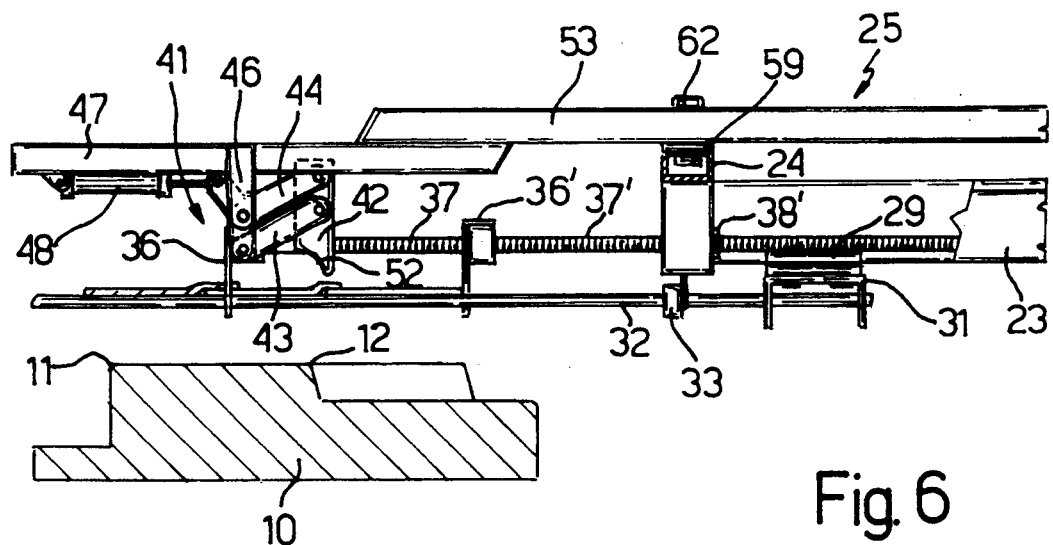
FIG. 6 shows a partial section along line VI—VI in FIG. 3 in a first operating position.
Figure 7:
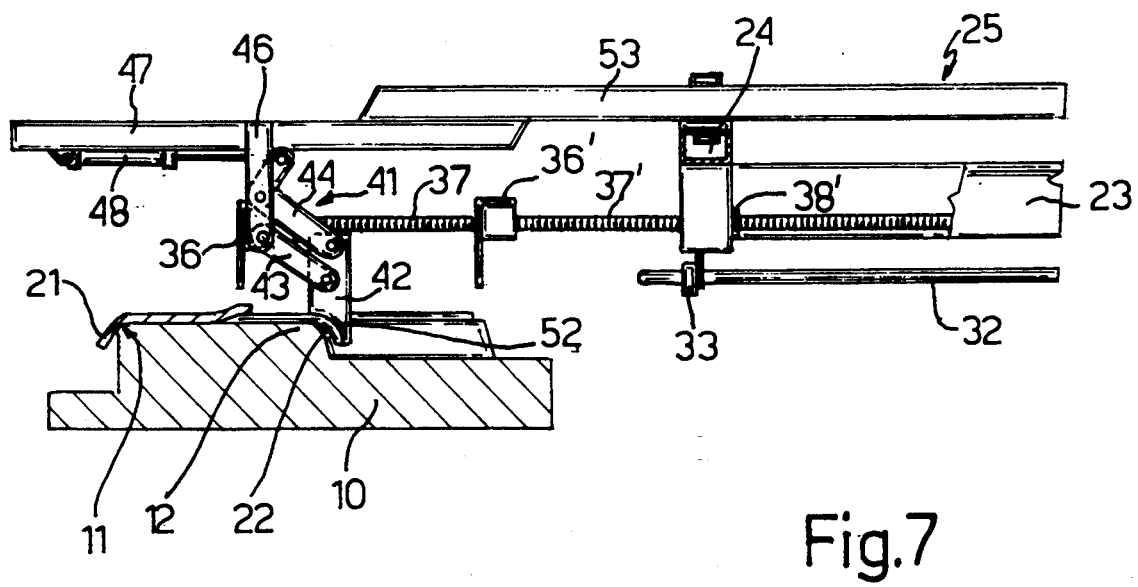
FIG. 7 shows the FIG. 6 section in a further operating position.

When idle, actuator 48 maintains finger 42 in the raised position as shown in FIGS. 4 and 6. When activated, rod 49 rotates lever 44 together with lever 43; and finger 42 moves parallel to itself along a curved trajectory, downwards and towards edge 11, 12, so that surface 52 of finger 42 folds portion 21, 22 towards edge 11, 12 as shown in FIGS. 5 and 7.

Each bar 47 is fitted in known manner to a corresponding box bar 53, so as to position surface 52 of finger 42 facing edge 11 (FIG. 4) and so form device 40, or facing edge 12 (FIG. 6) to form device 41. In FIG. 3, three box bars 53 are provided, each fitted in adjustable manner to cross members 24 and 27, in the space between two adjacent rectractable bars 32.

Figure 8:
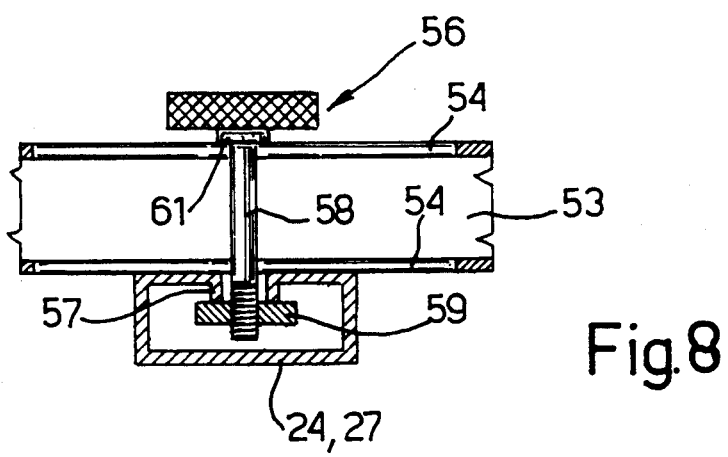
FIG. 8 shows a larger-scale section along line VIII—VIII in FIG. 3.

More specifically, the two horizontal walls of each bar 53 present two pairs of slots 54, each engageable by a fastening member 56 (FIG. 8) in a corresponding seat on cross members 24 and 27. Said seat comprises a bush 57 fitted inside a hole in the top wall of cross member 24, 27; and fastening member 56 comprises a partially threaded rod 58 engaging a washer 59 in turn engaging the bottom edge of bush 57. Rod 58 is also fitted to a washer 61 engaging the top wall of box bar 53, and is fitted with a knob 62 for locking or releasing bar 53 to/from respective cross member 24, 27.

Figure 2:
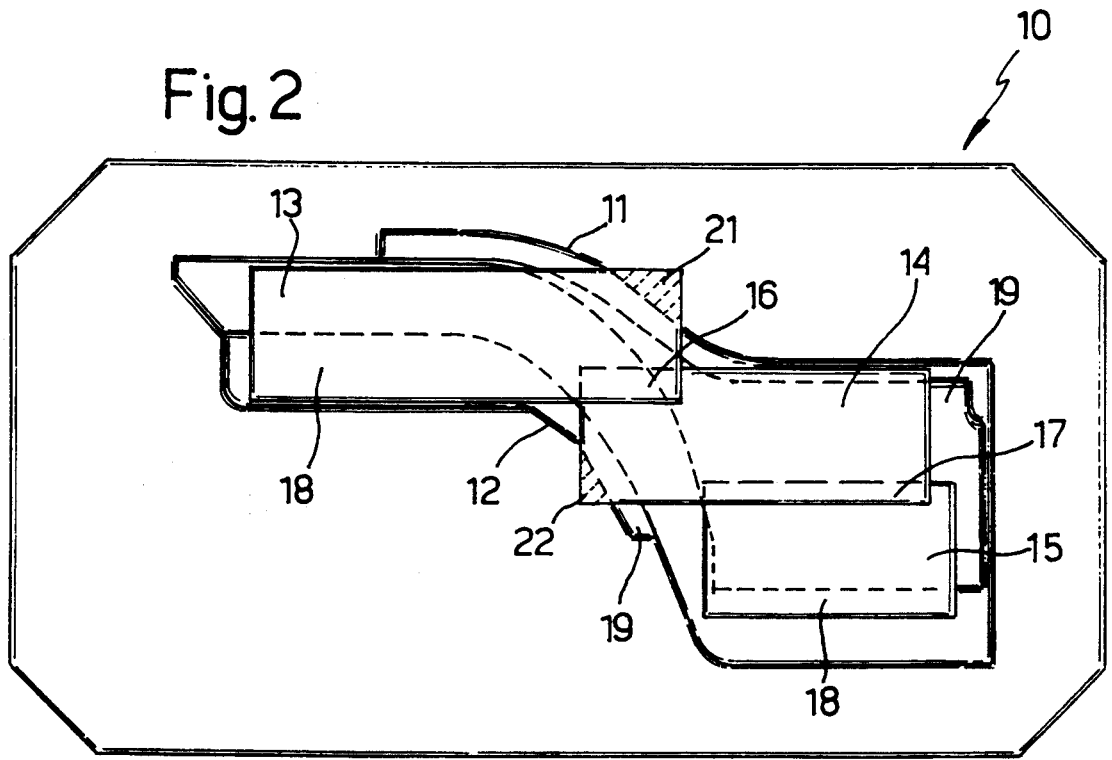
FIG. 2 shows a plan view of the FIG. 1 mold when loaded.

Operation of loading fixture 25 will now be described with reference to sheets 13-15 in FIG. 2.

At each loading cycle, a pack of sheets 13-15 is placed in any known manner on retractable bars 32, as shown in FIGS. 4 and 6. For transferring sheets 13-15 in the required position on to mold 10, reference bars 36 and 36' must first be positioned, by means of handwheels 39 and 39' (FIG. 3), so as to arrest respective sheets 13 and 15 accordingly (FIG. 2).

Also, to fold portion 21 against edge 11 of mold 10, one of bars 53 (the top one in FIG. 3) must be set so as to position device 40, between two retractable bars 32, over portion 21 (FIG. 4). Similarly, to fold portion 22 against edge 12 of mold 10, another bar 53 (the second one from the top in FIG. 3) must be set so as to position device 41 over portion 22 (FIG. 6). In the example shown, the bottom bar 53 is not required, and respective device 40 or 41 remains idle.

Once loading fixture 25 is positioned over mold 10 by means of arm 28, the two actuators 35 are operated to move retractable bars 32 rightwards in FIGS. 3-7 by means of bar 29 and channel 31. As sheets 13 and 15 contact bars 36 and 36', the pack of sheets 13-15 is arrested as shown in FIGS. 4 and 6.

As retractable bars 32 continue moving, sheets 13-15 are gradually deposited on mold 10, and, upon bars 32 moving to the right of finger 42 of device 40 (FIG. 4), actuator 48 of device 40 is operated to lower finger 42, the surface 52 of which folds portion 21 of sheet 13 against edge 11 of mold 10, as shown in FIG. 5.

Similarly, upon bars 32 moving to the right of finger 42 of device 41 (FIG. 6), actuator 48 of device 41 is operated, and surface 52 of finger 42 folds portion 22 of sheet 14 against edge 12 of mold 10, as shown in FIG. 7. At this point, both actuators 48 are operated simultaneously to restore devices 40 and 41 to the idle position; arm 28 withdraws fixture 25 from mold 10; and the press is operated to form the part inside mold 10.

The advantages of the loading fixture according to the present invention will be clear from the foregoing description. In particular, by folding portions 21 and 22, it provides, not only for eliminating trimming, but also for making better use of the sheet material by reinforcing the respective portions of the finished part.

To those skilled in the art it will be clear that changes may be made to the fixture as described and illustrated herein without, however, departing from the scope of the present invention. For example, finger 42 of each device 40, 41 may be controlled using a mechanism other than the one described herein; the same bar 53 may be fitted with both devices 40, 41; and changes may be made to the number of bars 53 and the manner in which they are fitted to cross members 24 and 27.

I claim:

1. A fixture for loading plastic sheet material into a mold, comprising supporting means (23-27, 32) for transferring at least one sheet (13-15) of said material to said mold (10), at least one portion (21, 22) of said sheet (13-14) extending outward of said mold (10), and at least one element (42) activated when transferring said sheet (13-15) to said mold (10), for engaging said portion (21, 22) and folding it about said edge (11, 12), said supporting means (23-27, 32) further comprising a number of parallel bars (32) on which said sheet (13-15) is placed; said bars (32) being retractable in relation to at least one reference member (36, 36') set to the required position of said sheet (13-15) on said mold (10); and said element (42) being moved substantially perpendicular to said bars (32).

2. A fixture as claimed in claim 1, wherein said element (42) forms part of a device (40, 41) carried by a supporting bar (47, 53) fitted in removable manner to a frame (23-27) supporting said retractable bars (32); said supporting bar (47, 53) being positioned parallel to and between two adjacent said retractable bars (32).

3. A fixture as claimed in claim 2, further comprising fastening means (56) for fastening said supporting bar (47, 53) to two cross members (24, 27) of said frame (23-27); said fastening means (56) enabling adjustment of said supporting bar (47, 53) perpendicular to said cross members (24, 27).

4. A fixture as claimed in claim 1, wherein said element (42) is provided with a curved surface (52) for folding said portion (21, 22) substantially −90° downwards; said element (42) being lowered along a curved trajectory having a component in the direction of said edge (11, 12).

5. A fixture as claimed in claim 3, wherein said device (40, 41) also comprises an articulated parallelogram mechanism (43, 44) connected to said element (42) and activated by a linear actuator (48).

6. A fixture as claimed in claim 5, wherein said device (40, 41) is adapted to be fitted to said supporting bar (47, 53) in either of two positions to enable said element (42) to fold said portion (21, 22) in either one of two substantially opposite directions corresponding to said positions.

7. A fixture as claimed in claim 6, further comprising a number of said supporting bars (47, 53) interspersed with said retractable bars (32); each said supporting bar (47, 53) being selectively fitted with said device (40, 41) in either of said two positions.

8. A fixture as claimed in claim 6, wherein said number of retractable bars (32) is loaded with a pack of partially overlapping sheets (13–15) for forming complex parts; at least two reference members (36, 36') being provided for separately aligning two respective sheets (13, 15) in said pack (13–15) on said mold (10).

9. A fixture as claimed in claim 8, wherein said pack (13–15) presents at least two portions (21, 22) projecting in opposite directions from two edges (11, 12) of said mold (10); and at least two supporting bars (47, 53), each fitted with said device (40, 41) in a corresponding one of said positions, whereby the relevant elements (42) are oppositely oriented to engage said two portions (21, 22).

10. A fixture for loading plastic sheet material into a mold for manufacturing a vehicle body component having at least a bent edge (11, 12), comprising supporting means (23–27, 32) for transferring at least one sheet (13–15) of said material to said mold (10), at least one portion (21, 22) of said sheet (13–14) extending outward of said edge (11, 12), and further comprising at least one finger (42) mounted on said supporting means (23–27, 32) and provided with a curved surface (52), said finger (42) being movable parallel to itself along a curved trajectory having a component toward said edge (11, 12), and means (48) for moving said finger (42) when transferring said sheet (13–15) to said mold (10) for engaging said curved surface (52) with said portion (21, 22) and folding the portion (21, 22) so engaged against said edge (11, 12).

* * * * *